June 9, 1925. 1,541,665
B. F. B. SEWELL
TRACTOR ATTACHMENT
Filed Dec. 11, 1917 4 Sheets-Sheet 4
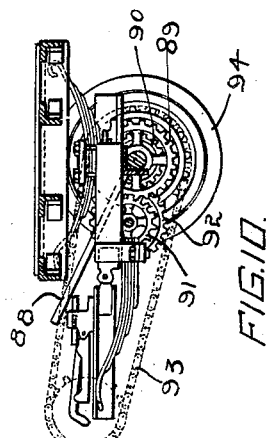
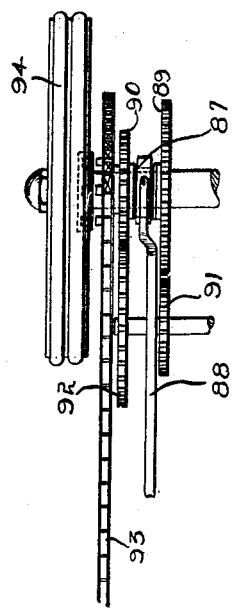
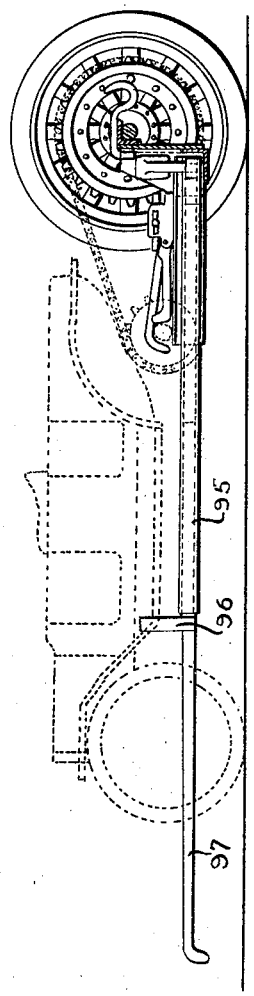
Inventor
B. F. Brooke Sewell
Witness
R. G. Thomas
By Day W. Day
Attorney Patented June 9, 1925.

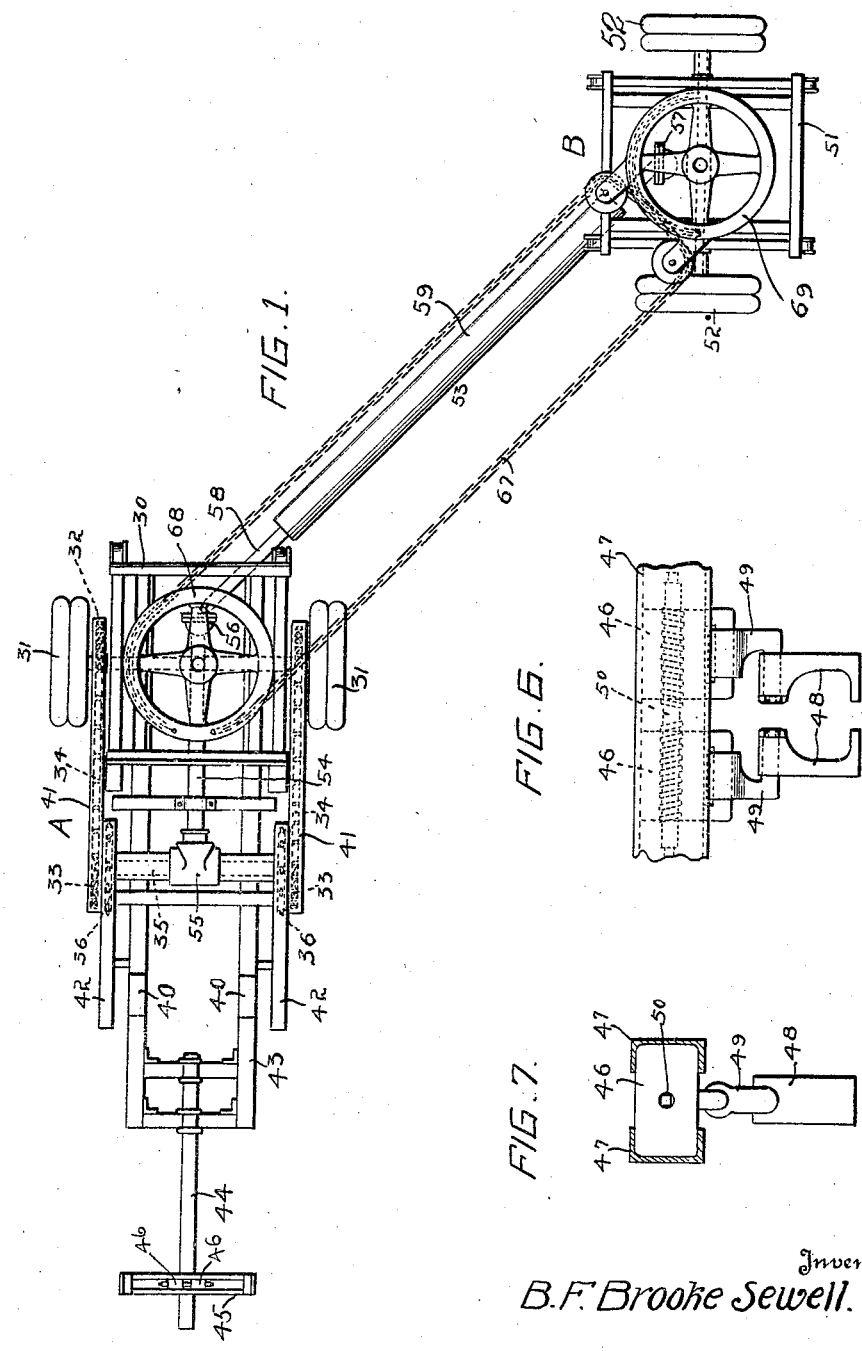

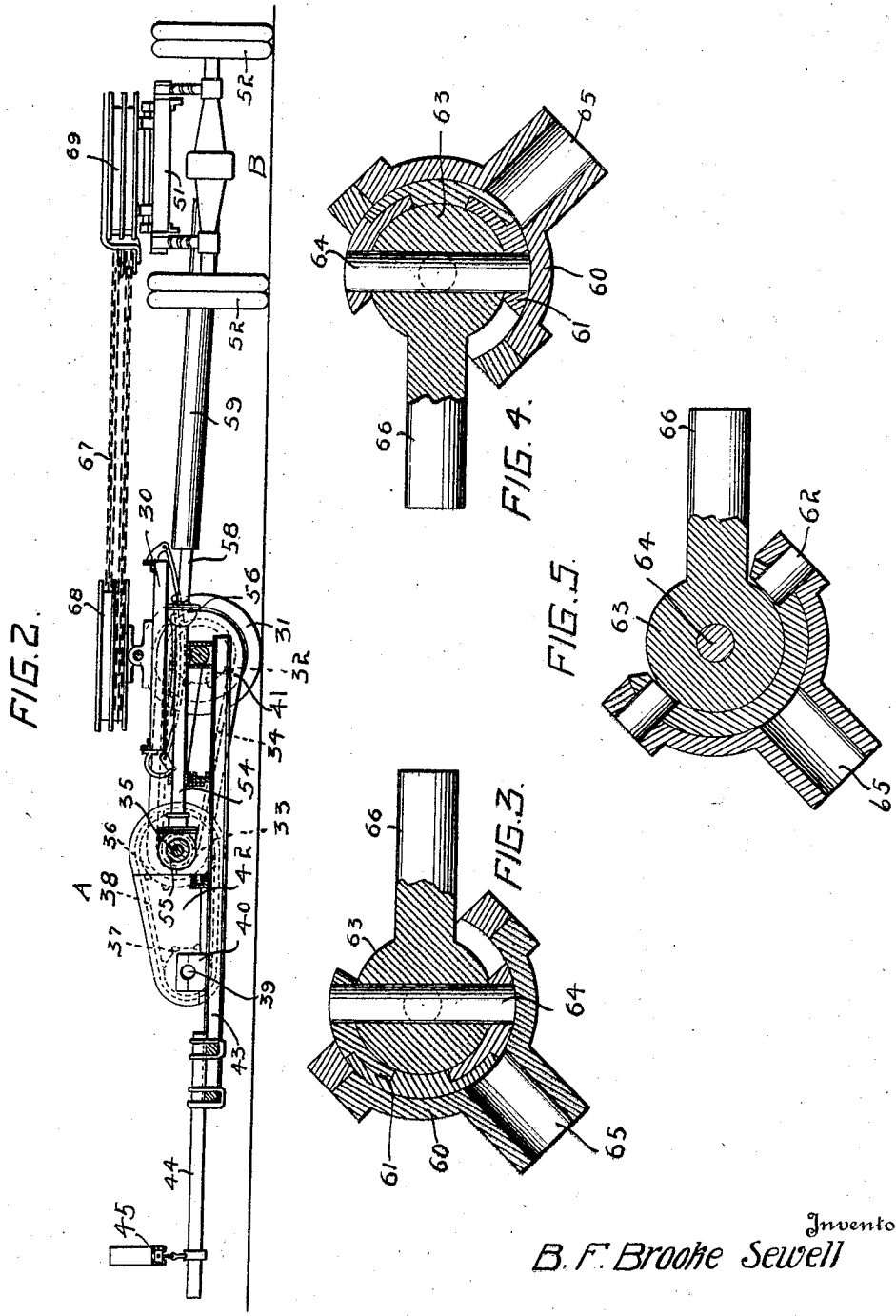

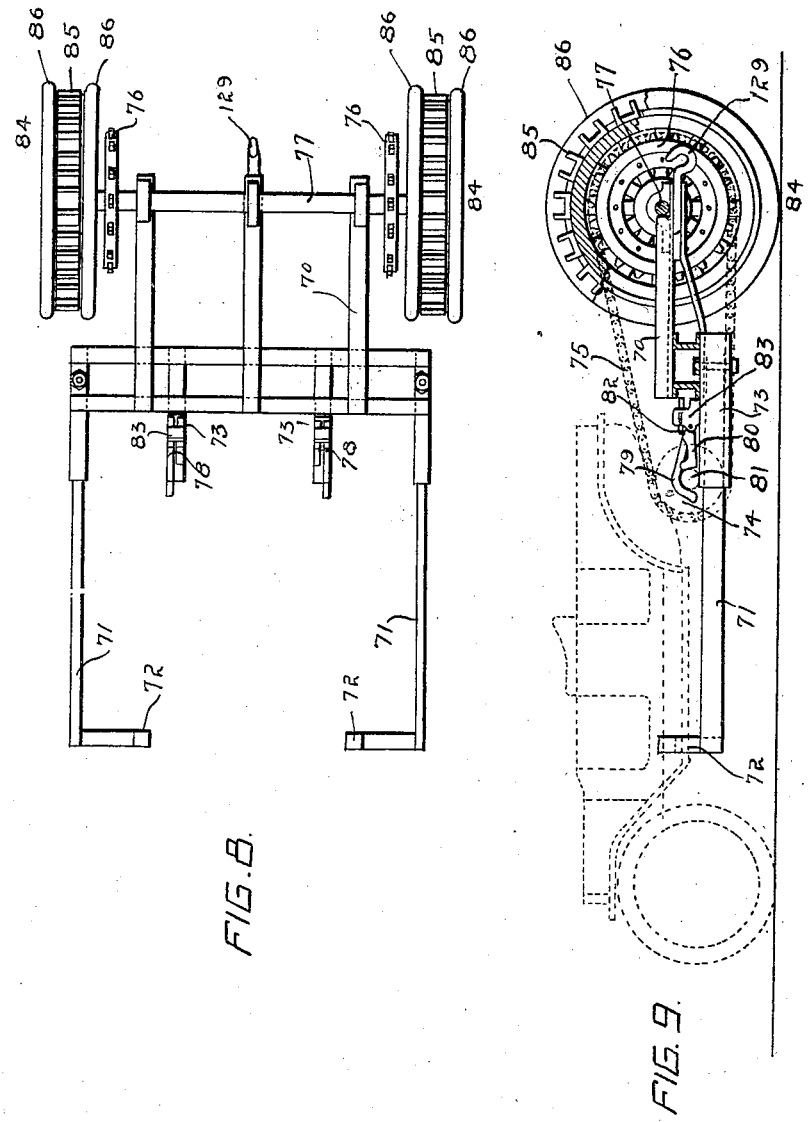

1,541,665

UNITED STATES PATENT OFFICE.

BENJAMIN F. BROOKE SEWELL, OF CHULA, VIRGINIA.

TRACTOR ATTACHMENT.

Application filed December 11, 1917. Serial No. 206,703.

*To all whom it may concern:*

Be it known that I, BENJAMIN F. BROOKE SEWELL, a citizen of Great Britain, residing at Chula, in the county of Amelia, State of Virginia, have invented certain Improvements in Tractor Attachments, of which the following is a description, reference being had to the accompanying drawings, forming a part thereof.

The object of the invention is to provide a tractor or traction attachment for motor vehicles, whereby the attachment and detachment may be effected with ease and rapidity, and without modifying the construction or arrangement of the elements of the vehicle, other than the possible, and under some conditions the preferable, removal of the driving wheels thereof.

Further objects and advantages will appear hereinafter, it being understood that various changes in form, proportions, and details of construction and arrangement, especially in adapting the attachment to different types of vehicles and in providing for the diversified uses to which such an attachment can be applied, may be resorted to, within the scope of the appended claims, without departing from the spirit of the invention.

In the drawings:

Figure 1 is a plan view of a tractor or traction attachment of a plural member type.

Fig. 2 is a side view of the same.

Figs. 3 and 4 are detail sectional views of the joints at opposite ends of the universal driving shaft between the members of the tractor.

Fig. 5 is a section of the joint at one end of the universal driving shaft, taken on a plane at right angles to that of Figs. 3 and 4.

Fig. 6 is a detail view of the hanger for the reach rod of the tractor.

Fig. 7 is a transverse section of the hanger.

Figs. 8 and 9 are respectively plan and side views of a modified and simplified form of tractor.

Fig. 10 is a side view of another modified form, embodying a change speed gearing.

Fig. 11 is a plan view of a portion of the form shown in Fig. 10, to show the gearing.

Fig. 12 is a side view of a simple form of tractor having the side bar supports for the rear axle of the vehicle.

In the construction illustrated in Figs. 1 to 7 inclusive the tractor is of a plural member type, adapted to be operated as a train for carrying supplies and the like, and having, for example, the main truck A and one or more trailer trucks B, (only one of the latter being illustrated). The main truck is provided with a frame or bed 30, of any suitable form or construction to fulfill the desired purpose, and traction wheels 31, connected by chain gearing, consisting of sprocket wheels 32 and 33 and a chain 34 with a countershaft 35, which in turn is connected by speed reducing gearing, consisting of sprocket wheels 36 and 37 and a chain 38 with the drive wheel shaft 39 of a motor vehicle (not shown), the boxing for the vehicle axle or shaft being indicated at 40. The trains of gearing, consisting of the sprockets and chains, are preferably encased in housings 41 and 42, for the exclusion of dust and moisture, and the forward housings 42 are preferably sectional to facilitate access to the chain for engagement thereof with the sprocket wheel on the vehicle shaft from which the drive-wheels have been removed.

Extending forward from the frame of the truck is a reach-frame 43, disposed under the vehicle axle, to support the same, and terminating in a reach bar 44 having a swivel or rocking connection with the body of the vehicle, as by a hanger 45, (see detail Figs. 6 and 7) consisting of blocks 46, mounted in a guide 47, clutch jaws 48 having a swinging connection through links 49 with the blocks, and a right and left feed screw 50, engaging the blocks and adapted to move them toward or from each other to cause engagement or disengagement of the jaws 48 with or from the reach rod.

The trailer truck is provided with a frame 51 and drive wheels 52, the axle of which is geared through a universal shaft 53 with a transmission shaft 54 on the main truck, said transmission shaft preferably having a differential connection with the counter shaft 35, (the differential being of any ordinary or approved construction) as indicated at 55. The terminals of the universal shaft 53 are coupled with the transmission and driving shafts, respectively, of the main and trailer trucks by universal joints indicated at 56 and 57, and shown in detail in Figs. 3–5, and said universal shaft is of extensible construction, consisting of telescopically related elements 58 and 59. Said universal joints embody outer and inner cups 60 and 61, the latter being socketed in the former and being rockingly secured in place by the pivot 62, and a ball 63, socketed in the inner cup and rockingly secured by a pivot 64 arranged in a plane perpendicular to the pivot 62, said outer cup and the ball respectively having stems 65 and 66 for attachment to the parts to be connected.

Also, connecting the trucks is a compensating device consisting of cables or chains 67 traversing the peripheries of tables 68 and 69, respectively carried by the main and trailer trucks, to insure the "tracking" of the wheels of said trucks.

The construction illustrated in Figures 8 and 9 embodies the general features of the main truck already described, with the frame 70 provided with forwardly extending arms or reach bars 71 for engagement by means of hangers 72 with the side bars of the vehicle chassis, and rests 73 for arrangement under the vehicle axle to support the rear end of the car independently of the drive wheels thereof which may be removed, as indicated in Fig. 9, to permit of the application of the sprocket wheels 74, connected by chains 75 with sprocket wheels 76 on the truck axle 77. The rests 73 carry axle clamps 78 having elements 79 and 80 for engaging the vehicle axle 81 at its forward and rear sides, and these elements which may be pivoted to facilitate engagement with the axle are locked in their axle engaging positions by a wedge or key 82 driven in a keeper 83. Either of the forms of the tractor herein disclosed may have its drive wheels 84 provided with spurred treads 85 arranged between smooth or cushion treads 86 and countersunk so as to come into action only on soft, sandy, or muddy roads or ground.

The form of tractor shown in Figs. 10 and 11 differs from that just described mainly in having a change speed gearing controlled by a clutch 87 for actuation by a shift lever 88 to connect either of the gears 89 and 90 which respectively operate through the gears 91 and 92 secured to the counter shaft to convey motion from the chain 93 to the traction wheel 94 at different rates of speed.

Fig. 12 also illustrates a form similar, essentially, to that of Figs. 8 and 9, with the addition that the side arms 95 having the hangers 96 are extended to form levers 97 which may be utilized as means of lifting the side arms to engage said hangers with the side bars of the vehicle chassis.

The wide range of adaptability of the described mechanism to various uses on the farm and in the field will be readily apparent.

Having described the invention what is claimed is:

1. A traction attachment for motor vehicles having a central longitudinal swivel connection with the motor vehicle and rests at either side of said longitudinal center for engagement with the drive axle of said vehicle, the swivel connection consisting of a reach rod on the tractor and a swinging clamp on the vehicle.

2. A traction attachment for motor vehicles having a central longitudinal swivel connection with the motor vehicle and rests at either side of said longitudinal center for engagement with the drive axle of said vehicle, the swivel connection consisting of a reach rod on the tractor and a clamp on the vehicle having swinging jaws and means for positioning the jaws to engage the reach-rod.

3. A traction attachment for motor vehicles having a central longitudinal swivel connection with the motor vehicle and rests at either side of said longitudinal center for engagement with the drive axle of said vehicle, the swivel connection consisting of a reach rod on the tractor and a clamp on the vehicle, said clamp embodying carrier blocks, means for simultaneously moving them toward and from each other, and hinged jaws carried respectively by the blocks.

4. A tractor attachment for motor vehicles having a central longitudinal swivel connection with the motor vehicle and rests at either side of said vehicle, the swivel connection consisting of a reach rod on the tractor and a support on the vehicle providing for pivotal action.

This specification signed and witnessed this 30th day of November, 1917.

BENJAMIN F. BROOKE SEWELL.

Witnesses:
GRAYSON M. KNAPP,
REGINALD A. THOMAS.